(12) United States Patent
Batni et al.

(10) Patent No.: US 8,036,361 B2
(45) Date of Patent: Oct. 11, 2011

(54) SELECTION OF RINGBACK TONE INDICATIVE OF EMOTIONAL STATE THAT IS INPUT BY USER OF CALLED COMMUNICATION DEVICE

(75) Inventors: Ramachendra P. Batni, Phoenix, AZ (US); Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 1116 days.

(21) Appl. No.: 11/015,609

(22) Filed: Dec. 17, 2004

(65) Prior Publication Data
US 2006/0147021 A1    Jul. 6, 2006

(51) Int. Cl.
*H04M 3/42* (2006.01)
(52) U.S. Cl. ......... 379/210.01; 379/201.01; 379/207.13; 379/201.07; 379/372; 379/373.01; 455/566; 455/418; 455/415; 455/421
(58) Field of Classification Search ............. 379/201.01, 379/207.13, 67, 201.07, 372–373.03, 207.15, 379/207.16; 455/566, 415, 418, 421
See application file for complete search history.

(56) References Cited

U.S. PATENT DOCUMENTS

| | | | | | |
|---|---|---|---|---|---|
| 4,606,065 | A | * | 8/1986 | Beg et al. | 382/170 |
| 5,666,400 | A | * | 9/1997 | McAllister et al. | 379/88.01 |
| 5,933,525 | A | * | 8/1999 | Makhoul et al. | 382/186 |
| 5,982,303 | A | * | 11/1999 | Smith | 341/22 |
| 2002/0077135 | A1 | * | 6/2002 | Hyon | 455/466 |
| 2004/0107235 | A1 | * | 6/2004 | Koskelainen | 709/200 |
| 2004/0114732 | A1 | | 6/2004 | Choe | |
| 2004/0132435 | A1 | | 7/2004 | No | |
| 2005/0105706 | A1 | * | 5/2005 | Kokkinen | 379/201.01 |
| 2006/0023862 | A1 | * | 2/2006 | Sutcliffe | 379/257 |

FOREIGN PATENT DOCUMENTS

WO   WO 2004/054282 A2   6/2004
WO   WO 2004/095817 A1   11/2004

* cited by examiner

*Primary Examiner* — Curtis Kuntz
*Assistant Examiner* — Joseph J Nguyen
(74) *Attorney, Agent, or Firm* — Carmen Patti Law Group, LLC (57) ABSTRACT

A ringback tone, indicative of an emotional state that is input by a user of a called communication device, is selected to play to a calling communication device during a call to the called communication device.

28 Claims, 4 Drawing Sheets

SELECTION OF RINGBACK TONE INDICATIVE OF EMOTIONAL STATE THAT IS INPUT BY USER OF CALLED COMMUNICATION DEVICE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"FEEDBACK TO CALLING COMMUNICATION DEVICE ON CALL CONNECTED WITH INTELLIGENT NETWORK SIGNALING," by Batni et al., Ser. No. 10/683,969, filed Oct. 10, 2003.

"CALL CATEGORY FOR A CALL THAT TERMINATES AT ANNOUNCEMENT SERVER COMPONENT," by Kevin D. Beauford, Ser. No. 10/697,216, filed Oct. 30, 2003.

TECHNICAL FIELD

The invention relates generally to communications and more particularly to called party selected feedback played to a calling party.

BACKGROUND

Known ringback tone services allow a user of a called communication device to preselect a ringback tone to be played to a calling communication device. Traditionally, the calling party would hear a standard ringing sound before the called party answers the call. The ringback tone service replaces that standard ringing sound with a ringback tone selected by the user of the called communication device. For example, the ringback tone service allows the user of the called communication device to customize the ringing sound that a user of the calling communication device hears while calling the called communication device.

To set up the ringback tone service, the user of the called communication device sends ringback tone selection criteria to a ringback tone service component. The ringback tone selection criteria indicate which ringback tone to play in various circumstances. For example, the ringback tone selection criteria may instruct the ringback tone service component to play a first user-selected ringback tone for any call with a first set of characteristics, and to play a second user-selected ringback tone for any call with a second set of characteristics.

The ringback tone service only allows quantitative and objective ringback tone selection criteria to determine which ringback tone to play to the calling communication device. For example, the user may input any combination of time of day criteria, day of week criteria, day of year criteria, and/or calling party number or identity criteria. The ringback tone service component compares objective characteristics of the incoming call to the ringback tone selection criteria to determine which ringback tone to play to the calling communication device. The ringback tone service does not allow the user to create ringback tone selection criteria based on subjective factors. As one shortcoming, the ringback tone service limits the level of customization provided to the user of the called communication device by not allowing subjective ringback tone selection criteria.

Thus, a need exists for one or more ringback tone selection criteria based on subjective factors selected by a user of a called communication device.

SUMMARY

A ringback tone service customizes the ringing sound that a user of a calling communication device hears while calling a called communication device. The ringback tone service allows a user of the called communication device to input ringback tone selection criteria that indicate which ringback tone to play to the calling communication device in various circumstances. The ringback tone selection criteria may be based on subjective factors, such as an emotional state input by the user of the called communication device.

In one embodiment, there is provided a method for selecting a ringback tone, indicative of an emotional state that is input by a user of a called communication device, to play to a calling communication device during a call to the called communication device.

In another embodiment, there is provided a method for: associating a plurality of ringback tone identification repositories with a plurality of respective emotional states; determining, upon receipt of a call from a calling communication device for the called communication device, that one ringback tone identification repository of the plurality of ringback tone identification repositories corresponds to a current emotional state input by the user of the called communication device; and playing to the calling communication device a ringback tone that is associated with the one ringback tone identification repository to indicate the current emotional state.

In yet another embodiment, there is provided a method for comparing an emotional state input by a user of a calling communication device to an emotional state input by a user of a called communication device to determine whether to play to the calling communication device: a first ringback tone indicative of the emotional state input by the called communication device; a second ringback tone indicative of the emotional state input by the calling communication device; or a third ringback tone not indicative of either the emotional state input by the called communication device or the emotional state input by the calling communication device.

DESCRIPTION OF THE DRAWINGS

Features of exemplary implementations of the invention will become apparent from the description, the claims, and the accompanying drawings in which:

DETAILED DESCRIPTION

Figure 1:
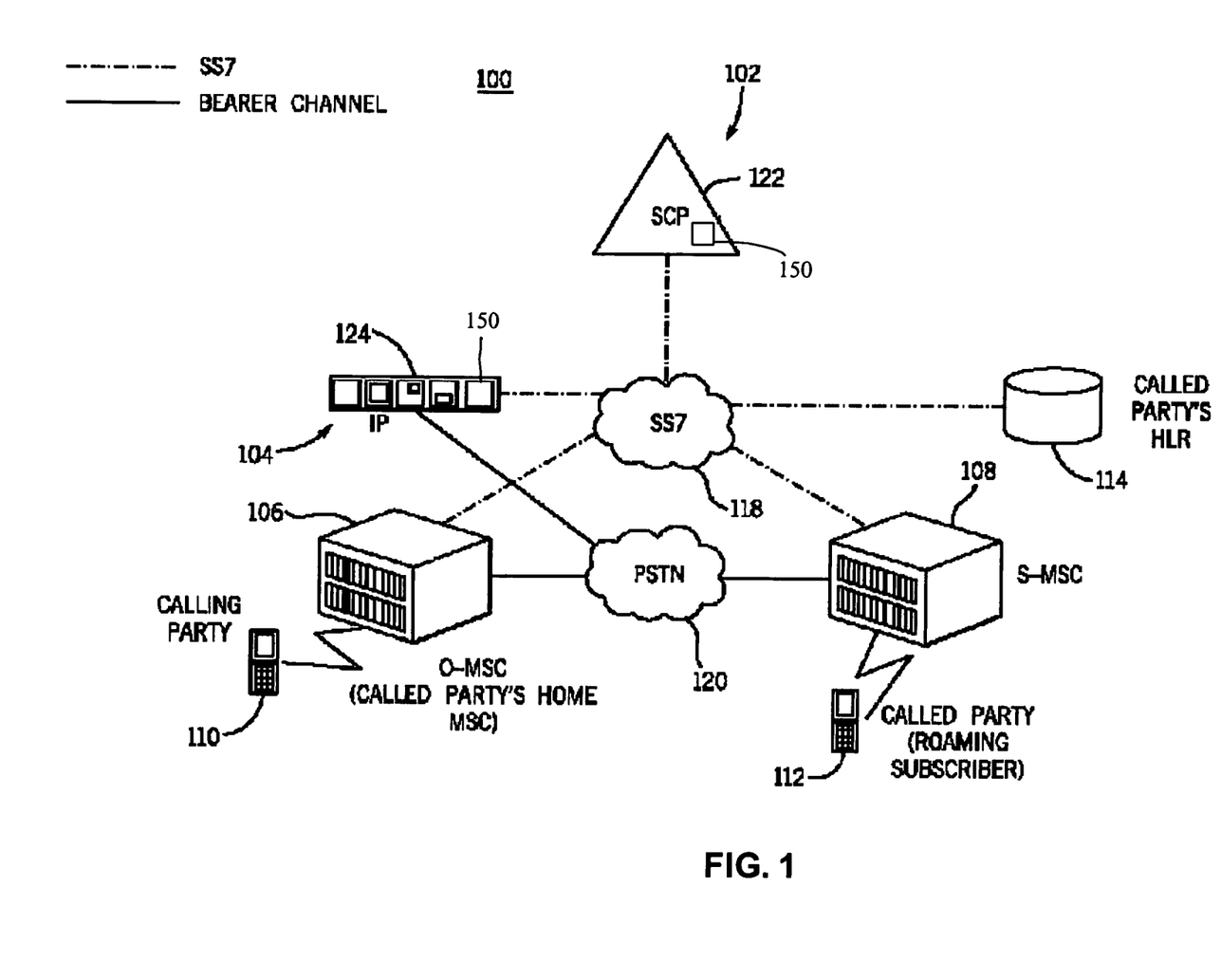
FIG. 1 is a representation of one implementation of an apparatus that comprises one or more intelligent network platforms, one or more mobile switching centers, a calling communication device, and a called communication device.

Turning to FIG. 1, an apparatus 100 provides a ringback tone service for wireless and/or wire-line telecommunication systems. The apparatus 100 in one embodiment comprises one or more intelligent network ("IN") platforms 102 and 104, one or more mobile switching centers ("MSCs") 106 and 108, a calling communication device 110, and a called communication device 112. In one example, the apparatus 100 further comprises a home location register ("HLR") 114 associated with the called communication device 112.

A signaling network 118 communicatively couples the intelligent network platforms 102 and 104, the MSCs 106 and 108, and the home location register 114. The signaling network 118 in one example comprises a signaling system 7 ("SS7") network that supports signaling traffic. A bearer network 120 communicatively couples the intelligent network platform 104 and the MSCs 106 and 108. The bearer network 120 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 comprise wireless intelligent network ("WIN") platforms. In one example, the intelligent network platforms 102 and 104 comprise Customized Applications for Mobile network Enhanced Logic ("CAMEL") platforms. Exemplary embodiments of the intelligent network platforms 102 and 104 comprise one or more of a service control point ("SCP") 122 and a intelligent peripheral ("IP") 124. The intelligent network platforms 102 and 104 comprise an instance of a recordable data storage medium 150, as described herein.

The intelligent network platforms 102 and 104 may be combined into a single intelligent network platform or divided into a plurality of intelligent network platforms. The intelligent network platforms 102 and 104 serve to route calls, connect calls to communication devices, and play ringback tones to the calling communication device 110 during a call from the calling communication 110 device for the called communication device 112. For example, the intelligent network platforms 102 and 104 serve to enable a ringback tone service. The intelligent network platforms 102 and 104 allow a user of the called communication device 112 to preselect a ringback tone to play to the calling communication device 110.

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example comprises a call controller and a data server. In one example, the call controller and the data server reside on a single SCP. In another example, the call controller and the data server reside on different SCPs. If the call controller and the data server reside on different SCPs, then the call controller queries the data server on the separate SCP for subscriber profile information and to determine what ringback tone to play at the calling communication device 110. The SCP 122 in one example provides instruction to the IP 124 to control the functionality of the IP 124. For example, the SCP 122 sends messages to the IP 124 to instruct the IP 124 to play the ringback tone to the calling communication device 110.

The SCP 122 in one example employs one or more of WIN, CAMEL, ANSI Capability Set 1 ("CS-1"), International Telecommunication Union ("ITU-T") CS-1, and session initiation protocol ("SIP") signaling to route calls that require the ringback tone service to the IP 124. An exemplary employment of WIN signaling is illustrated herein. For example, the SCP 122 receives WIN signaling relating to an incoming call at the MSC 106 for the called communication device 112 and sets parameters in WIN signaling messages to direct the incoming call to the IP 124. Therefore, the IP 124 can play the preselected ringback tone to the calling communication device 110. For example, the SCP 122 routes the incoming call to the IP 124, so the IP 124 may play the preselected ringback tone at the calling communication device 110 prior to connection of the call with the called communication device 112. To route the incoming call to the IP 124, the SCP 122 in one example sets a TerminationList parameter of a WIN signaling message to a directory number of the IP 124. Then, the SCP 122 sends the TerminationList parameter in the WIN signaling message to the MSC 106 that queried the SCP 122 on what action to take for the incoming call. Upon receipt of the WIN signaling message, the MSC 106 connects the call to the IP 124.

The intelligent network platforms 102 and 104 in one example employ WIN signaling, Integrated Services Digital Network User Part ("ISUP") signaling, and ANSI-41 signaling to enable the ringback tone service. The WIN signaling, ISUP signaling, and ANSI-41 signaling are in accordance with ANSI-41 standards. In one exemplary implementation, the signaling messages follow one or more of ANSI/TIA/EIA-41-D, TIA/EIA/IS-771, and TIA/EIA/IS-826 standards. Since the SCP 122 employs standard based WIN signaling to route the call from the calling communication device 110 to the IP 124, then other network components may be standards based network components. For example, the MSCs 106 and 108 and the HLR 114 comprise standards based network components. Therefore, the MSCs 106 and 108 and the HLR 114 do not require modifications to enable the ringback tone service.

In one example, the SCP 122 determines that one or more characteristics of the incoming call match one or more ringback tone selection criteria set up by the user of the called communication device 112. Therefore, the SCP 122 routes the incoming call to the IP 124 to invoke the ringback tone service. If the incoming call matches the ringback tone selection criteria, then the IP 124 plays the preselected ringback tone at the calling communication device 110. The IP 124 plays the ringback tone at the calling communication device 110 between receipt of the call from the calling communication device 110 and answer of the call by the called communication device 112. In one example, the IP 124 stores the available ringback tones. In another example, the IP 124 accesses a storage component that stores the available ringback tones.

In another example, the one or more characteristics of the incoming call do not match the one or more ringback tone selection criteria. In this case, the SCP 122 can either route the incoming call to the IP 124 to invoke a Default ringback tone to be played to the calling communication device 110, or alternatively respond with a Continue message to have the O-MSC 106 play the normal ringback tone to the calling communication device 110.

The IP 124 individually connects call legs with the calling communication device 110 and the called communication device 112 to communicatively couple the calling communication device 110 with the called communication device 112. For example, the IP 124 receives an incoming call leg from the calling communication device 110. The IP 124 connects with the incoming call leg to establish communication with the calling communication device 110. Then, the IP 124 initiates an outgoing call leg to the called communication device 112 to establish communication with the called communication device 112. To connect the calling communication device 110 with the called communication device 112, the IP 124 bridges the incoming call leg with the outgoing call leg. For example, the IP 124 hairpins the incoming call leg with the outgoing call leg.

The MSCs 106 and 108 support mobile telecommunication devices, for example, the communication devices 110 and 112. The MSCs 106 and 108 in one example comprise an originating mobile switching center ("O-MSC") 106 and a serving mobile switching center ("S-MSC") 108. For example, the O-MSC 106 supports a home area of the called communication device 112 and the S-MSC 108 supports the called communication device 112 if the called communication device 112 moves to a roaming area. If the called communication device 112 is within the home area supported by the O-MSC 106, then the S-MSC 108 may not be in the call path between the calling communication device 110 and the called communication device 112. For example, the O-MSC 106 would also serve as a S-MSC for the called communication device 112.

Figure 2:
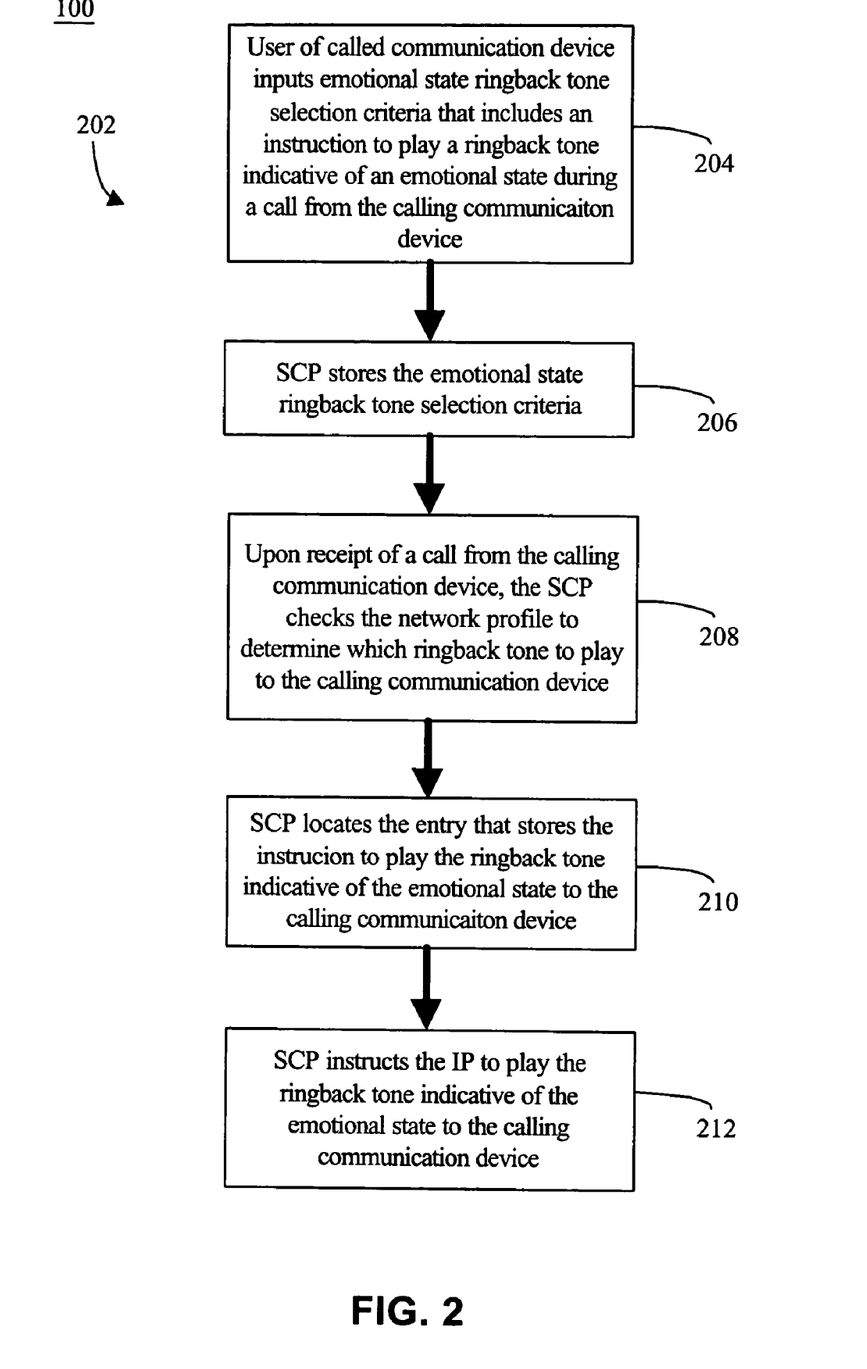
FIG. 2 is a representation of one exemplary logic flow that illustrates a selection of a ringback tone indicative of an emotional state that is input by the user of the called communication device of the apparatus of FIG. 1.
Figure 3:
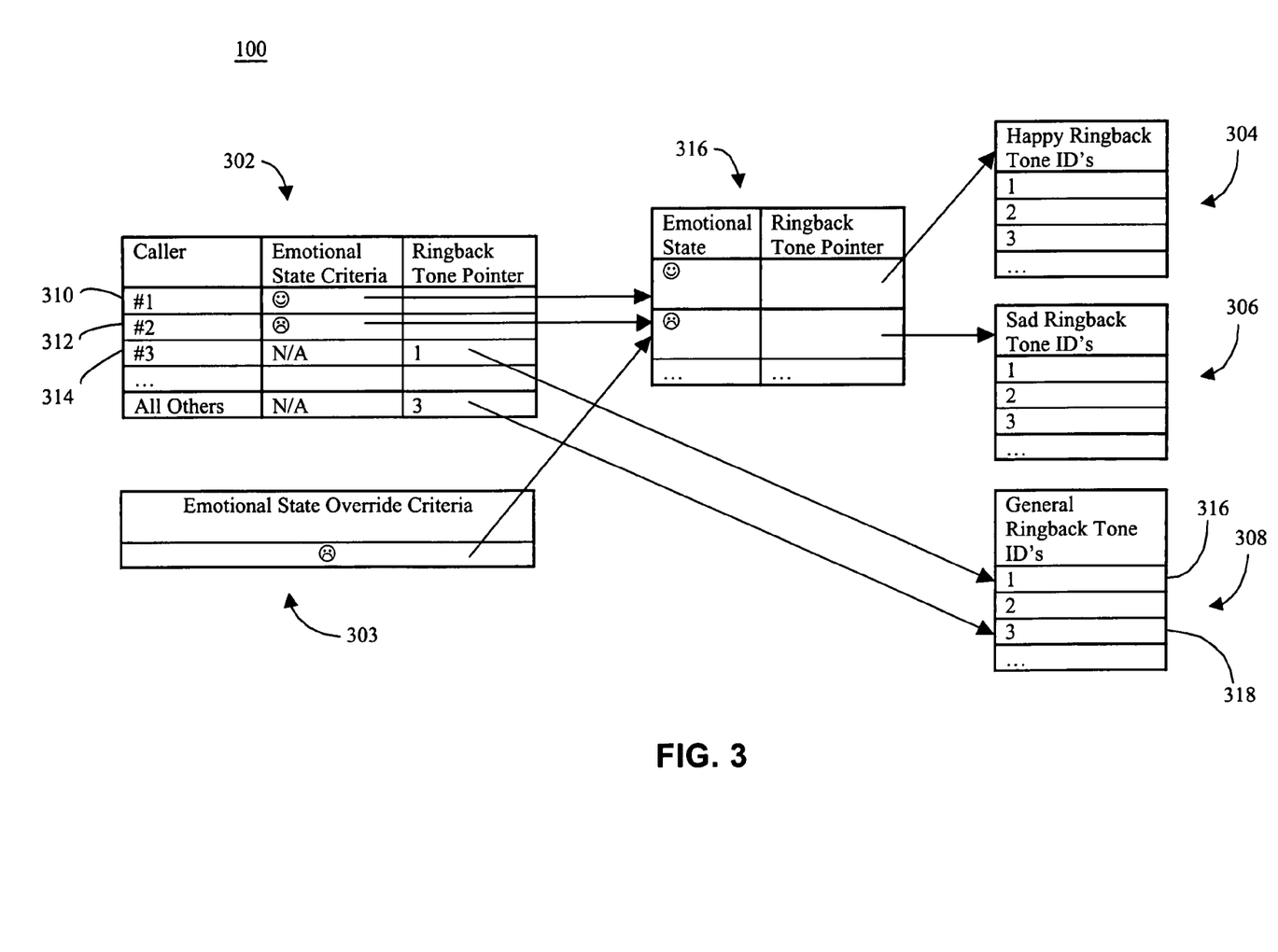
FIG. 3 is a representation of one or more ringback tone identification repositories and one or more network profiles for the called communication device of the apparatus of FIG. 1.

Referring to FIGS. 1-3, an illustrative description of one exemplary operation of the apparatus 100 is presented, for explanatory purposes. Exemplary logic 202 serves to illustrate a selection of a ringback tone indicative of an emotional state that is input by the user of the called communication device 112. The logic 202 employs one or more steps, for example, STEPS 204, 206, 208, 210 and 212. The user of the called communication device 112 in one example performs STEP 204. The SCP 122 in one example performs the STEPS 206, 208, 210 and 212.

At STEP 204, the user of the called communication device 112 inputs ringback tone selection criteria to set up the ringback tone service. The ringback tone selection criteria includes an instruction to play a ringback tone indicative of an emotional state during a call from the called communication device 112. In one example, the user employs a web interface to enter the ringback tone selection criteria. In another example, the user employs an interactive voice response or wireless application protocol menu presented by the called communication device 112 to enter the ringback tone selection criteria. The user may employ the web interface for an initial configuration of the ringback tone service and then use a menu on the called communication device 112 to make adjustments. For example, the user may use a menu on the called communication device 112 to change the current emotional state stored in a network profile 302 for the user of the called communication device 112 from happy to sad. In another example, the user may use the menu on the called communication device 112 to change the current override emotional state stored in an emotional state override profile 303 for the user of the called communication device 112 from happy to sad. The called communication device 112 in one example displays a plurality of emoticons representative of emotional states for the user to select. For example, the user can associate the emoticons with various callers stored in the network profile 302. In another example, the user can associate the emoticons with all callers in the emotional state override profile 303.

The user of the called communication device 112 may instruct the SCP 122 to invoke the ringback tone service upon occurrence of an incoming call with specific characteristics. For example, the user sends the ringback tone selection criteria to the SCP 122 to indicate specific ringback tones to play for incoming calls with specific characteristics. The ringback tone selection criteria may be based on objective factors, such as time of day, day of week, day of year, and/or calling party number or identity. The ringback tone selection criteria may also be based on subjective factors, such as an emotional state input by the user of the called communication device. The emotional state may comprise a human emotion, such as happy, sad, angry, confused, embarrassed, disappointed, or the like. The emotional state may be associated with an emoticon, such as a smiling emoticon, frowning emoticon, angry emoticon, winking emoticon, crying emoticon, hot emoticon, or the like.

The ringback tone selection criteria in one example comprises emotional state ringback tone selection criteria. For example, the emotional state ringback tone selection criteria indicates which ringback tone to play based on an emotional state input by the user of the called communication device 112.

In one example, the emotional state ringback tone selection criteria indicates emotional state override criteria. The emotional state override profile 303 stores the emotional state override criteria. Once the user activates an override emotional state, the override emotional state is used to determine the ringback tone for all incoming calls and overrides other ringback tone selection criteria. For example, if the override emotional state is set to sad, then the sad emotional state is used to determine the ringback tone for all incoming calls.

In another example, the emotional state override profile 303 is not active and the SCP 122 employs the ringback tone selection criteria stored in the network profile 302 to select a ringback tone. The emotional state stored in the network profile 302 is used to determine the ringback tone for individual callers or a user-selected subgroup of callers. For example, the user of the called communication device 112 may set an emotional state only for the calling communication device 110. The emotional state may be based on a special relationship between the user of the called communication device 112 and the user of the calling communication device 110. For example, if the user of the called communication device 112 and the user of the calling communication device 110 have been in a fight, then the user of the called communication device 112 could input a sad or angry emotional state for calls from the user of the calling communication device 110. The network profile 302 stores the emotional states input for individual callers or user-selected subgroups of callers.

At STEP 206, the SCP 122 stores the emotional state ringback tone selection criteria. For example, the SCP 122 creates one or more entries in the network profile 302 of the user of the called communication device 112 to store the emotional state ringback tone selection criteria. The network profile 302 stores the current emotional states to be applied to various calling parties. The SCP 122 stores the current emotional state input by the user of the called communication device 112 in the network profile 302. Upon receipt of a change in emotional state input by the user, the SCP 122 modifies the entries in the network profile 302 to reflect the new current emotional state. In another example, the SCP 122 receives an override emotional state. The SCP 122 stores the override emotional state in the emotional state override profile 303. If active, the emotional state in the emotional state override profile 303 overrides any ringback tone selection criteria stored in the network profile 302. If the emotional state in the emotional state override profile 303 is not active, the SCP 122 employs the ringback tone selection criteria stored in the network profile 302 to select a ringback tone.

The SCP 122 creates a plurality of ringback tone identification ("ID") repositories to organize the available ringback tones for the called communication device 112. The ringback tone ID repositories contain one or more references to ringback tones. For example, a reference to a ringback tone comprises an identification and/or location of the ringback tone. The ringback tone ID repositories may be associated with a plurality of respective emotional states. The plurality of ringback tone ID repositories in one example comprises a happy ringback tone ID repository 304, a sad ringback tone ID repository 306, and a general ringback tone ID repository 308.

The emotional state ringback tone selection criteria comprises an indication of one or more specific ringback tones that are indicative of specific emotional states. The user of the called communication device 112 selects one or more ringback tones to be indicative of each emotional state. For example, the user selects one or more ringback tones to be indicative of a happy emotional state, one or more ringback tones to be indicative of a sad emotional state, and one or more ringback tones not indicative of a particular emotional state. The SCP 122 includes references to the one or more ringback tones indicative of the happy emotional state in the happy ringback tone ID repository 304. The SCP 122 includes references to the one or more ringback tones indicative of the sad emotional state in the sad ringback tone ID repository 306. The SCP 122 includes references to the one or more ringback tones not indicative of a particular emotional state in the general ringback tone ID repository 308.

At STEP 208, upon receipt of a call from the calling communication device 110, the SCP 122 checks the emotional state override profile 303 to determine if the user set an override emotional state. In one example, the user did set an override emotional state and the SCP 122 employs the override emotional state in the emotional state override profile 303 to determine the ringback tone to play on the call. In another example, the user did not set an override emotional state and the SCP 122 employs the network profile 302 to determine which ringback tone to play to the calling communication device 110.

At STEP 210, the SCP 122 in one example determines that the user did not set the override emotional state and the called communication device 100 is caller #1 in the network profile 302. The SCP 122 determines that the current emotional state set by the user of the called communication device 112 for the calling communication device 110 is not empty, but set to the happy emotional state. For example, the emotional state ringback tone selection criteria indicates to play a ringback tone indicative of the happy emotional state. The SCP 122 determines that the happy ringback tone ID repository 304 corresponds to the current emotional state input by the user of the called communication device 112 for the calling communication device 110.

At STEP 212, the SCP 122 instructs the IP 124 to play a ringback tone from the one or more ringback tones that correspond to the ringback tone references stored in the happy ringback tone ID repository 304. The SCP 122 may randomly select a reference to the ringback tone from the one or more references to ringback tones stored in the happy ringback tone ID repository 304. Alternatively, the SCP 122 may employ other selection criteria, such as sequential round-robin selection, for ringback tone reference selection. The SCP 122 sends this information to the IP 124, which then plays the ringback tone indicative of the happy emotional state to the calling communication device 110 before the user of the called communication device 112 answers the call. The ringback tone indicative of the happy emotional state in one example serves to convey the current emotional state of the user of the called communication device 112 to the user of the calling communication device 110. The ringback tone can be used to set a mood for the following conversation. If the user of the called communication device 112 is sad, and the user of the calling communication device 110 hears a sad ringback tone, the user of the calling communication device 110 may modify the mood of the conversation to correspond to the emotional state of the user of the called communication device 112. For example, the user of the calling communication device 110 may be less exuberant on the call.

Referring to FIGS. 1 and 3, the ringback tone selection criteria that is input by the user of the called communication device 112 in one example is stored in the network profile 302. The user of the called communication device 112 in one example activates a happy emotional state for calls from caller #1 stored in entry 310 of the network profile 302, and a sad emotional state for calls from caller #2 stored in entry 312 of the network profile 302. The happy and sad emotional states points to a repository pointer table 316. The repository pointer table 316 directs the SCP 122 to the appropriate ringback tone ID repository. For example the repository pointer table 316 comprises an entry for the happy emotional state with a pointer to the happy ringback tone ID repository 304. The repository pointer table 316 also comprises an entry for the sad emotional state with a pointer to the sad ringback tone ID repository 306. The ringback tone is selected from the happy ringback tone ID repository 304 for calls from the caller #1 stored in entry 310, and the ringback tone is selected from the sad ringback tone ID repository 306 for calls from the caller #2 stored in entry 312.

The user of the called communication device 112 in one example does not activate an emotional state for caller #3 stored in entry 314 of the network profile 302 or calls from other callers. Therefore, the ringback tone for calls from the caller #3 stored in the entry 314 or other callers is selected from the general ringback tone ID repository 308. For example, the ringback tone selection criteria indicates to select ringback tone reference 316 from the general ringback tone ID repository 308 for calls from the caller #3 stored in entry 314, and to select ringback tone reference 318 from the general ringback tone ID repository 308 for calls from other callers. The network profile 302 may store other ringback tone selection criteria (not shown) in addition to the emotional state ringback tone selection criteria, such as time of day or day of week selection criteria.

In addition to emotional states, the user of the called communication device 112 may base the ringback tone selection on other subjective user preferences. For example, the user may associate one or more ringback tones with a subjective user preference. Upon determination that the subjective user preference is activated for a call, the SCP 122 selects to play one of the one or more ringback tones associated with the subjective user preference. The subjective user preference in one example comprises a sports team preference. The ringback tone selection criteria may comprise an indication that the user is a fan of a particular sports team. If the team wins and the SCP 122 receives a call for the called communication device 112, the SCP 122 may select a ringback tone from the happy ringback tone ID repository 304. If the team looses and the SCP 122 receives a call for the called communication device 112, the SCP 122 may select a ringback tone from the sad ringback tone ID repository 306.

Figure 4:
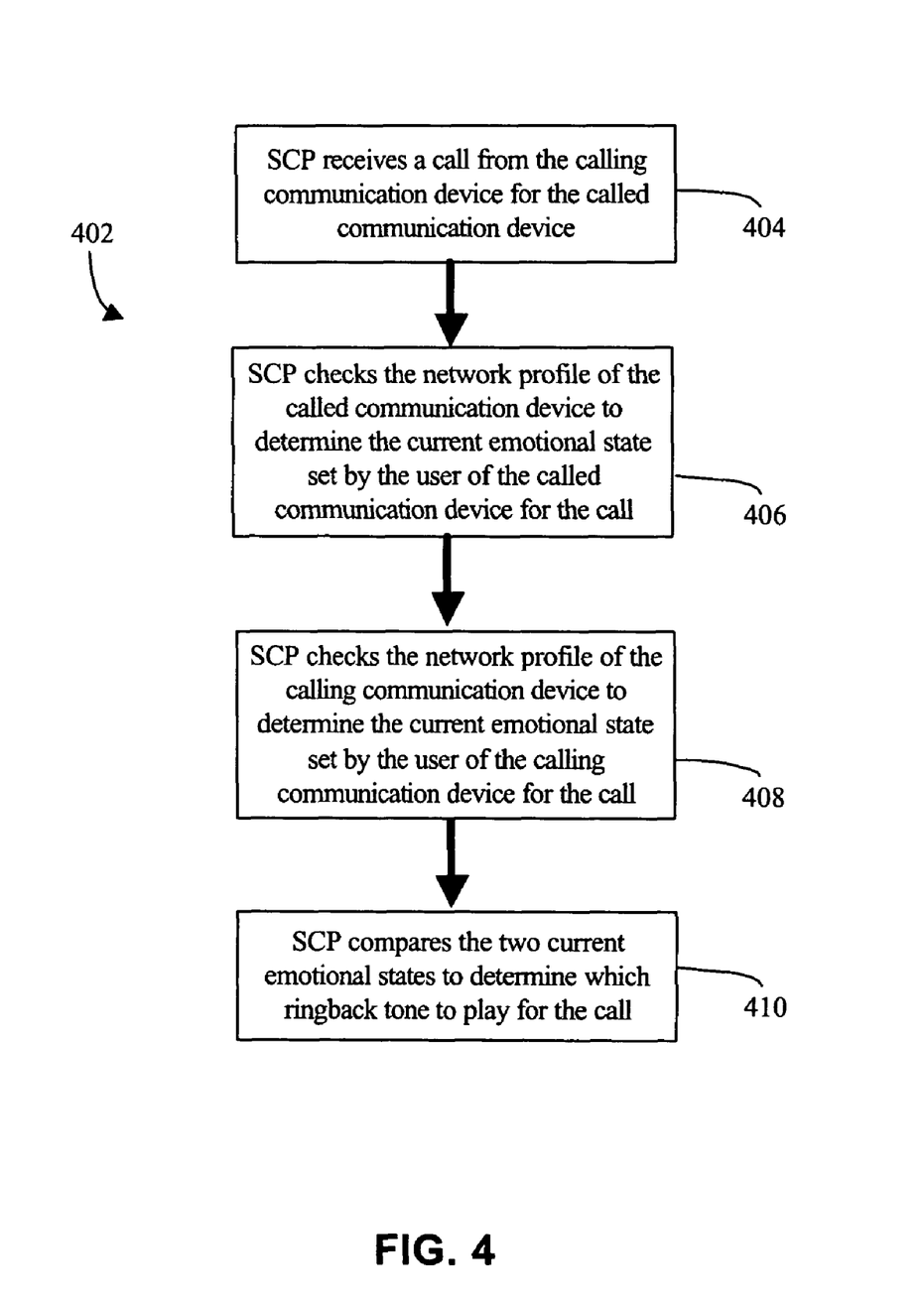
FIG. 4 is a representation of one exemplary logic flow that illustrates a comparison of two current emotional states to determine which ringback tone to play for a call. The emotional states are input by the users of the called and calling communication devices of the apparatus of FIG. 1.

Referring to FIGS. 1 and 4, an illustrative description of another exemplary operation of the apparatus 100 is presented, for explanatory purposes. Exemplary logic 402 serves to illustrate a comparison of two current emotional states to determine which ringback tone to play for a call. The emotional states are input by the users of the calling communication device 110 and the called communication device 112. The logic 402 employs one or more steps, for example, STEPS 404, 406, 408 and 410. The SCP 122 in one example performs the STEPS 404, 406, 408 and 410.

At STEP 404, the SCP 122 receives a call from the calling communication device 110 to the called communication device 112. In one example, the SCP 122 has access to both the user profile 302 (FIG. 3) of the called communication device 112 and a user profile (not shown) of the calling communication device 110. At STEP 406, the SCP 122 accesses the network profile 302 of the called communication device 112 to acquire the applicable current emotional state for the call input by the user of the called communication device 112. At STEP 408, the SCP 122 accesses the network profile of the calling communication device 110 to acquire the applicable current emotional state for the call input by the user of the calling communication device 110. At STEP 410, the SCP 122 compares the two current emotional states and determines whether to play: a first ringback tone indicative of the emotional state input by the called communication device 112; a second ringback tone indicative of the emotional state input by the calling communication device 110; or a third ringback tone not indicative of either the emotional state input by the called communication device 112 or the emotional state input by the calling communication device 110.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the intelligent network platforms 102 and 104. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:

receiving and storing one or more objective ringback tone selection criterion input by a user of a called communication device that indicate to play a default ringback tone to a calling communication device, wherein the objective ringback tone selection criteria comprise one or more of time of day criteria, day of week criteria, day of year criteria, or calling party identity criteria;

receiving and storing one or more emotional state ringback tone selection criterion input by the user of a called communication device, said input representing emotional states chosen from a plurality of emoticons displayed on the called communication device, said ringback tone selection criterion including at least associations between one or more characteristics of a calling communication device and one or more emotional states input by the user;

storing one or more ringback tone identification repositories, each corresponding to a different emotional state as input by the user of the called communication device;

receiving a call from the calling communication device;

determining whether one or more characteristics of the calling communication device match stored ringback tone selection criterion;

employing the one or more emotional state ringback tone selection criteria to select a ringback tone from the ringback tone identification repository indicative of the emotional state for the call, upon determination that the emotional state is activated for the call;

employing the one or more objective ringback tone selection criteria to select the default ringback tone the call, upon determination that the emotional state is not activated for the call; and playing the selected ringback tone.

2. The method of claim 1, wherein the step of employing the one or more emotional state ringback tone selection criteria to select the ringback tone from the ringback tone identification repository comprises the step of:

selecting, in a sequential round-robin or random order, the ringback tone from a plurality of ringback tones stored in the ringback tone identification repository by the user as indicative of the emotional state.

3. The method of claim 1, wherein the step of storing one or more ringback tone identification repositories further comprises the steps of:

receiving an indication, via the called communication device, of one or more happy ringback tones selected by the user for use if the emotional state of the user is happy and storing the indications in a ringback tone identification repository associated with the happy emotional state; and receiving an indication, via the called communication device, of one or more sad ringback tones selected by the user for use if the emotional state of the user is sad and storing the indications in a ringback tone identification repository associated with the sad emotional state;

wherein the step of selecting the ringback tone, indicative of the emotional state that is input by the user of the called communication device, to play to the calling communication device during the call to the called communication device comprises the steps of:

selecting the ringback tone from the one or more happy ringback tones, upon determination that the emotional state of the user is happy; and selecting the ringback tone from the one or more sad ringback tones, upon determination that the emotional state of the user is sad.

4. The method of claim 3, wherein the emotional state comprises any one of happy, sad, or an additional emotional characteristic dependent on a relationship between the user of the called communication device and a user of the calling communication device.

5. The method of claim 1, further comprising the steps of:
receiving an override emotional state that corresponds to an emoticon that is input by the user of the called communication device; and
employing the override emotional state to ignore one or more other ringback tone selection criteria and to select the ringback tone indicative of the override emotional state to play for all calling communication devices while the override emotional state is active.

6. The method of claim 1, wherein the ringback tone comprises a first ringback tone, wherein the emotional state comprises a first emotional state, the method further comprising the steps of
receiving the first emotional state that corresponds to a first emoticon that is input by the user of the called communication device;
employing the first emotional state to select the first ringback tone to play for calls from a first subset of calling communication devices; and
employing a second emotional state that corresponds to a second emoticon or one or more other ringback tone selection criteria to select a second ringback tone to play for calls from a second subset of calling communication devices.

7. The method of claim 1, wherein the step of storing ringback tone selection criterion further comprises the steps of:
receiving one or more emotional state ringback tone selection criteria that are input by the user of the called communication device; and
creating one or more entries in a network profile of the user to store the one or more emotional state ringback tone selection criteria.

8. The method of claim 1, wherein the step of storing one or more ringback tone identification repositories further comprises the steps of:
creating a first ringback tone identification repository associated with a first emotional state selectable by the user of the called communication device;
creating a second ringback tone identification repository associated with a second emotional state selectable by the user of the called communication device;
receiving an indication of one or more first user-selected ringback tones to store in the first ringback tone identification repository; and
receiving an indication of one or more second user-selected ringback tones to store in the second ringback tone identification repository.

9. The method of claim 8, wherein the call comprises a first call, wherein the calling communication device comprises a first calling communication device, the method further comprising the step of
selecting a default ringback tone for a second call from a second calling communication device if an emotional state is not input by the user for calls from the second calling communication device.

10. The method of claim 1, wherein the call comprises a first call, and wherein the ringback tone comprises a ringback tone for the first call, the method further comprising the steps of:
receiving an indication of a subjective user preference that is input by the user of the called communication device;
associating one or more ringback tones with the subjective preference; and
selecting a ringback tone for a second call from the one or more ringback tones associated with the subjective user preference upon determination that the subjective user preference is activated for the second call.

11. The method of claim 10, wherein the subjective user preference comprises a preference for a sports team, and wherein the one or more ringback tones comprise one or more ringback tones that indicate that the sports team won and one or more ringback tones that indicate that the sports team lost; and
wherein the step of selecting the ringback tone for the second call from the one or more ringback tones associated with the subjective user preference upon determination that the subjective user preference is activated for the second call comprises the steps of:
determining whether the sports team won or lost a game; and
selecting the ringback tone for the second call from either the one or more ringback tones that indicate that the sports team won or the one or more ringback tones that indicate that the sports team lost, based on whether the sports team won or lost the game.

12. The method of claim 1, wherein the call comprises a first call, and wherein the ringback tone comprises a first ringback tone, and wherein the calling communication device comprises a first calling communication device, the method further comprising the step of:
comparing the emotional state input by the user of the called communication device to an emotional state input by a user of a second calling communication device to determine whether to play to the second calling communication device during a second call:
the first ringback tone indicative of the emotional state input by the called communication device;
a second ringback tone indicative of the emotional state input by the second calling communication device; or
a third ringback tone not indicative of either the emotional state input by the called communication device or the emotional state input by the second calling communication device.

13. The method of claim 1, wherein a service control point is operable to employ session initiation protocol (SIP) signaling to route calls that require the ringback tone.

14. The method of claim 1, wherein a service control point is operable to employ wireless intelligent network (WIN) signaling to route calls that require the ringback tone.

15. The method of claim 1, wherein the called communication device is operable to enable the user to employ an interactive voice response or a web interface to select the ringback tone from the plurality of emoticons displayed on the called communication device.

16. The method of claim 1, wherein the called communication device is operable to present an interactive voice response to the user to select the ringback tone from the plurality of emoticons displayed on the called communication device.

17. The method of claim 1, wherein the plurality of emoticons is associated with various callers stored in a network profile.

18. The method of claim 1, wherein a network that provides the ringback tone comprises one of a magnetic data storage medium, an optical data storage medium, a biological data storage medium, or an atomic data storage medium.

19. The method of claim 1, further comprising the step of playing a normal ringback tone from a switch that provides service to the calling communication device when the one or more characteristics of the call do not match the stored ringback tone selection criteria.

20. A method, comprising the steps of:
associating a plurality of ringback tone identification repositories with a plurality of respective emotional states as input by a user of a called communication device;
receiving an indication of one or more ringback tones selected by the user of the called communication device, each ringback tone associated with of an emotional state chosen from a plurality of emotional states by the user of the called communication device;
including references to the one or more ringback tones in a ringback tone identification repository that corresponds to the associated emotional state of the ringback tone;
associating one or more calling communication devices with one or more emotional states corresponding to the emotional states associated with the ringback tone identification repositories as input by a user of a called communication device;
receiving an override emotional state that is input by the user of the called communication device but not associated with a calling communication device;
determining, upon receipt of a call from a calling communication device for the called communication device, that an override emotional state has been input;
employing the override emotional state to ignore the associations between one or more calling communications devices and one or more emotional states and to select the ringback tone identification repository associated with the override emotional state; and
playing to the calling communication device a ringback tone that is associated with the selected ringback tone identification repository while the override emotional state is active.

21. The method of claim 20, wherein the one ringback tone identification repository that corresponds to the override emotional state comprises the first ringback tone identification repository, the method further comprising the step of:
selecting the ringback tone from the one or more first ringback tones of the first ringback tone identification repository upon determination that the override emotional state matches the first emotional state.

22. The method of claim 20, wherein the step of determining, upon receipt of the call from the calling communication device for the called communication device, that an override emotional state has been input further comprises the steps of:
receiving the override emotional state from the user of the called communication device;
storing the override emotional state in a network profile of the user; and
accessing the network profile, upon receipt of the call, to obtain the override emotional state and to determine the one ringback tone identification repository that corresponds to the override emotional state.

23. A method, comprising the steps of:
receiving and storing a user profile for a plurality of users of communication devices, each user profile comprising:
one or more ringback tone selection criterion input by each user that indicates to play a default ringback tone according to objective ringback tone selection criteria which comprise one or more of time of day criteria, day of week criteria, day of year criteria, or calling party identity criteria, and
an emotional state ringback tone selection criterion input by each user that indicates to play an emotional state ringback tone according to associations between one or more characteristics of a calling communication device and one or more emotional states input by the user;
receiving a call from a calling communication device to a called communication device;
selecting a ringback tone indicative of an emotional state that is input by a user of a called communication device, to play to a calling communication device during a call to the called communication device;
accessing a first ringback tone selection criteria from the user profile of the called communication device, wherein the first ringback tone selection criteria indicates a ringback tone associated with the calling communication device by the user of the called communication device;
accessing a second ringback tone selection criteria from the user profile of the called communication device, wherein the second ringback tone selection criteria indicates a ringback tone associated with the called communication device by the user of the calling communication device;
comparing the first ringback tone selection criteria to the second ringback tone criteria to determine the ringback tone to play to the calling communication device during the call to the called communication device, wherein the ringback tone is played during the call from the calling communication device when one or more characteristics of the call match the first ringback tone selection criteria and the second ringback tone criteria.

24. The method of claim 23, wherein the step of accessing the first ringback tone selection criteria comprises the step of:
obtaining the first ringback tone selection criteria from a first network profile for the user of the called communication device;
wherein the step of accessing the second ringback tone selection criteria comprises the step of:
obtaining the second ringback tone selection criteria from the first network profile for the user of the calling communication device.

25. The method of claim 23, further comprising the steps of:
receiving a user input from the user of the called communication device;
storing the user input as the first ringback tone selection criteria.

26. The method of claim 25, wherein the step of receiving the user input from the user of the called communication device comprises the step of:
receiving an indication of a selected emoticon of a plurality of emoticons from the user of the called communication device.

27. The method of claim 23, further comprising the steps of:
receiving a user input from the user of the calling communication device;
storing the user input as the second ringback tone selection criteria.

28. The method of claim 27, wherein the step of receiving the user input from the user of the calling communication device comprises the step of:
receiving an indication of a selected emoticon of a plurality of emoticons from the user of the calling communication device.

* * * * *